United States Patent [19]
Sinclair

[11] Patent Number: 6,069,827
[45] Date of Patent: May 30, 2000

[54] MEMORY SYSTEM

[75] Inventor: Alan Welsh Sinclair, Cottenham, United Kingdom

[73] Assignee: Memory Corporation PLC, Edinburgh, United Kingdom

[21] Appl. No.: 09/046,518

[22] Filed: Mar. 24, 1998

Related U.S. Application Data

[63] Continuation of application No. PCT/GB96/00250, Feb. 6, 1996.

[30] Foreign Application Priority Data

Sep. 27, 1995 [GB] United Kingdom .................. 9519670

[51] Int. Cl.$^7$ .................................................. G11C 16/04
[52] U.S. Cl. ................................ 365/185.29; 365/185.11; 365/185.33
[58] Field of Search ........................ 365/185.29, 185.11, 365/189.09, 185.33; 711/170; 395/497.02, 600

[56] References Cited

U.S. PATENT DOCUMENTS

| | | | |
|---|---|---|---|
| 4,511,964 | 4/1985 | Georg et al. | 364/200 |
| 5,404,485 | 4/1995 | Ban | 395/425 |
| 5,459,850 | 10/1995 | Clay et al. | 395/497.02 |
| 5,473,765 | 12/1995 | Gibbons et al. | 395/500 |
| 5,544,356 | 8/1996 | Robinson et al. | 395/600 |

FOREIGN PATENT DOCUMENTS

| | | |
|---|---|---|
| 0392895A3 | 10/1990 | European Pat. Off. . |
| 0424191A2 | 4/1991 | European Pat. Off. . |
| 0522780A2 | 1/1993 | European Pat. Off. . |
| 0544252A2 | 6/1993 | European Pat. Off. . |
| 0597706A2 | 5/1994 | European Pat. Off. . |
| 0617363A2 | 9/1994 | European Pat. Off. . |
| 0618535A2 | 10/1994 | European Pat. Off. . |
| 0619541A2 | 10/1994 | European Pat. Off. . |
| 2665791 | 2/1992 | France . |
| 2251323A | 7/1992 | United Kingdom . |
| 84/00628 | 2/1984 | WIPO . |
| 93/02418 | 2/1993 | WIPO . |
| 94/19746 | 9/1994 | WIPO . |
| 94/20906 | 9/1994 | WIPO . |
| 94/23369 | 10/1994 | WIPO . |
| 94/23432 | 10/1994 | WIPO . |
| 95/10083 | 4/1995 | WIPO . |
| 95/14272 | 5/1995 | WIPO . |

*Primary Examiner*—David Nelms
*Assistant Examiner*—Anh Phung
*Attorney, Agent, or Firm*—Pillsbury Madison & Sutro LLP

[57] ABSTRACT

A solid state memory for emulating a disk drive comprising: translation means for translating a logical sector address to a main memory address; a main memory composed of non-volatile memory cells erasable in blocks; characterized in that a first pointer is used to point to an unwritten location in main memory, and a second pointer is used to point to the next unerased erasable block in sequence to the erasable block containing the said unwritten memory location; control means being provided to ensure that there is always at least one erasable block in the erased condition between the first and second pointers.

12 Claims, 2 Drawing Sheets

MEMORY SYSTEM

This is a Continuation of International Appln. No. PCT/GB96/00250 filed Feb. 6, 1996, which designated the U.S.

BACKGROUND OF THE INVENTION

This invention relates to memory systems and, in particular, to memory systems for storing block structured data. It finds application where non-volatile memory cells are used as the storage medium. The particular type of non-volatile memory cells used in this invention are memory cells which do not allow erasure of individual cells but allow erasure of blocks of memory cells. Different memory cells, such as FLASH EPROM cells, chalcogenide memory cells, and ferro-optic cells may be used.

Many common memory storage devices for computers are based on rotating storage media such as the magnetic disk drive. Rotating storage media have, however, a few disadvantages. They require comparatively large amounts of power because they consist of rotating platters. They are comparatively slow to read from and write to because of the seek latency (the time taken to move the head to the correct location) and the rotational latency (the time taken to locate the correct part of a track). Magnetic disks are also comparatively heavy and not very robust (they are sensitive to being knocked). In contrast, semiconductor memory is lightweight, robust, consumes very little power, and is fast in operation. For these reasons it is desirable to use a solid state equivalent of the magnetic disk. The particular semiconductor chosen as the solid state memory is preferably high density, non-volatile, and has low cost per bit. This makes FLASH memory an ideal candidate.

There are many prior art references to the use of FLASH memory as the storage medium for a solid state disk drive. These references include the following patents: EP 0 392 895, EP 0 424 191, EP 0 522 780, EP 0 597 706, EP 0 617 363, EP 0 618 535, EP 0 619 541, GB 2 251 323, WO 93 02418, WO 94 19746, WO 94 20906, WO 94 23369, WO 94 23432, WO 95 14272, WO 95 10083, U.S. Pat. No. 4,511,964, WO 84 00628, WO 95 10083, WO 95 14272. Many of these references have certain features in common. For example, most references disclose the use of a table for converting the logical address from the host computer (usually in CHS—cylinder, head and sector-format) to a physical address in the FLASH memory or to an intermediate address which will be used for generating the physical address in FLASH memory. Most references also have some means for ensuring that one block is not written to substantially more times than another block. A third common feature in FLASH solid state disk emulators is a buffer for increasing the write speed to the semiconductor. The buffer is usually made of some fast memory such as SRAM (Static Random Access Memory).

Any solid state disk emulation system which uses FLASH memory as the storage medium must also have some method of controlling the erasure and writing of the cells. The reason for this is that the cells take a comparatively long time to erase and a cell can only be written to once before it needs to be erased. The present invention uses an algorithm which may be used in a solid state disk emulating system for controlling the writing and erasure of memory cells.

EP 0 522 780 describes a control method for a solid state disk which uses a memory managing table recording the number of times each cell has been erased, the status of each memory block and a buffer to hold data which is to be written to memory. The method involves copying sectors which are to be erased to another block before erasing the initial block.

EP 0 392 895 relates to the use of a cache memory for buffering writes to the FLASH memory to increase the speed of operation of the memory. The memory system in that disclosure uses means to determine "the time since each data file was last written". It also relates to correcting for errors and defect substitution, but these were the subject of divisional applications which are discussed below.

EP 0 618 535 relates to a solid state disk emulator which has defect substitution.

EP 0 617 363 relates to a method of correcting for defective cells in a FLASH memory by using pointers to point from the defective locations in the memory to the spare locations.

EP 0 424 191 relates to a method of storing sequential data in a memory which is accessible in a prescribed order. Defects in the memory are stored in an ordered directory so that these defective locations are skipped when the memory is being written to.

EP 0 619 541 provides a solid state disk emulating system which allows random access from a central processing unit. It also measures the erasure count for each block of memory so that a block can be avoided if it has been written to a large number of times.

EP 0 597 706 discloses a solid state peripheral storage device which uses a MAP ROM to map the logical sector address provided by the host to a physical address in the semiconductor memory. The addresses of any bad sectors in semiconductor memory are recorded in the MAP ROM. A microsequencer is used to control the mapping.

GB 2 251 323 describes a disk emulation system for FLASH memory. The clean up operation described in that disclosure is only automatic in the sense that it happens as a background task when certain conditions are met. Either the least cycled block is erased or the block with the highest number of deleted sectors is erased. This gives rise to an essentially random block selection for erasure.

WO 94 20906 discloses a FLASH file system which is used to emulate the operation of a disk drive. It uses a block allocation map to store information on the blocks in FLASH memory that can be written to. When a block is to be updated the allocation map is scanned until a free block is located. A transfer unit is used to facilitate memory reclaiming of the system. The transfer unit is an unwritten erased block of memory. The active (currently valid) data from a block of memory that contains old data (the old block) is written to the same locations in the transfer unit (the new block) and the old block is erased. The old block then becomes the transfer unit.

WO 94 23432 discloses a FLASH memory mass storage architecture. Erase cycles are avoided by programming altered data file into an empty mass storage block. Periodically the storage is cleaned up with a multi-sector erase. A counter is used to ensure that no block is erased more than a maximum number of times.

WO 94 23369 discloses a FLASH memory mass storage architecture which is very similar to that disclosed in WO 94 23432. Both disclosures are by the same applicant.

WO 94 19746 discloses a FLASH solid state drive which stores two bytes at a time. Each time a sector is written into FLASH memory a header is also written with it. If an older version of that sector exists in the memory then it is marked as invalid. When storage space dips below a certain threshold then a clean up operation is performed. Good data from a sector is copied to a buffer, the sector is erased and the good data is copied back to the sector.

WO 84 00628 discloses a method of managing defects in a storage media. The method involves receiving an address from a host, compensating the received address for the number of defective locations below that address, and accessing the compensated address. A sequentially ordered list of defective locations in the storage media is constructed.

WO 95 10083 uses counters to count the number of erase cycles each block has experienced and copies updated versions of data files to new locations. Periodically, blocks are erased to clean up the system. The blocks in the semiconductor memory are sized to conform to commercial hard disk sector sizes.

WO 95 14272 provides a method of generating the correct physical starting address from the number of the logical block to be accessed.

SUMMARY OF THE INVENTION

A preferred embodiment of the invention provides automatic equalisation of erase/write cycles throughout the entire memory. This automatic equalisation is automatic in the fullest sense in that the equalisation occurs as data is being written, rather than as a background task at some later time. It may also provide automatic compaction of the stored data. It may also achieve 100% efficiency in the use of available FLASH memory capacity, that is, all available FLASH memory is used. It may also permit the use of FLASH memory with any erasable block size: the erasable block size does not have to be 512 bytes. This permits error correction codes to be included with each segment of data stored. The invention may also facilitate a very simple translation from physical to FLASH address space.

The present invention provides a solid state memory for emulating a disk drive comprising: translation means for translating a logical address to a second address for accessing a store; a store composed of non-volatile memory cells erasable in blocks; characterised in that a first pointer is used to point to an unwritten location in the store, and a second pointer is used to point to the next unerased erasable block in sequence to the erasable block containing the said unwritten memory location; control means being provided to ensure that there is always at least one erasable block in the erased condition between the first and second pointers. A solid state memory where the said unwritten location in the store is the lowest unwritten location in the store.

A solid state memory where the said unwritten location in the store is the highest unwritten location in the store.

A solid state memory where the said next unerased erasable block in sequence to the erasable block containing the said unwritten memory location is the unerased erasable block with the lowest physical address above the first pointer.

A solid state memory where the said next unerased erasable block in sequence to the erasable block containing the said unwritten memory location is the unerased erasable block with the highest physical address below the first pointer.

A solid state memory, where the said next unerased erasable block in sequence to the erasable block containing the said unwritten memory location is determined by a suitable algorithm. A solid state memory where a buffer is used to increase the speed of writing data to the store.

A solid state memory where the said buffer is an SRAM buffer.

A solid state memory where the said buffer is a DRAM buffer.

A solid state memory, where the said store is FLASH EPROM.

A solid state memory where the said the store is composed of chalcogenide cells.

A solid state memory where the said the store is a ferro-optic memory.

A solid state memory where the said control means are provided by a microprocessor, a microcontroller, or a state machine.

In the present application an unwritten memory location does not refer to a memory location which has never been written to, but rather it refers to a location which is in the erased condition.

In the present application a second address may be a physical address, a physical block address, or an intermediate address.

BRIEF DESCRIPTION OF THE DRAWINGS

The invention will be particularly described, by way of example, with reference to the accompanying drawings, in which:

FIG. 3A shows a FLASH memory prior to the erase/write algorithm taking effect, FIG. 3B shows the same FLASH memory after the write/erase algorithm has taken effect.

DETAILED DESCRIPTION

Figure 1:
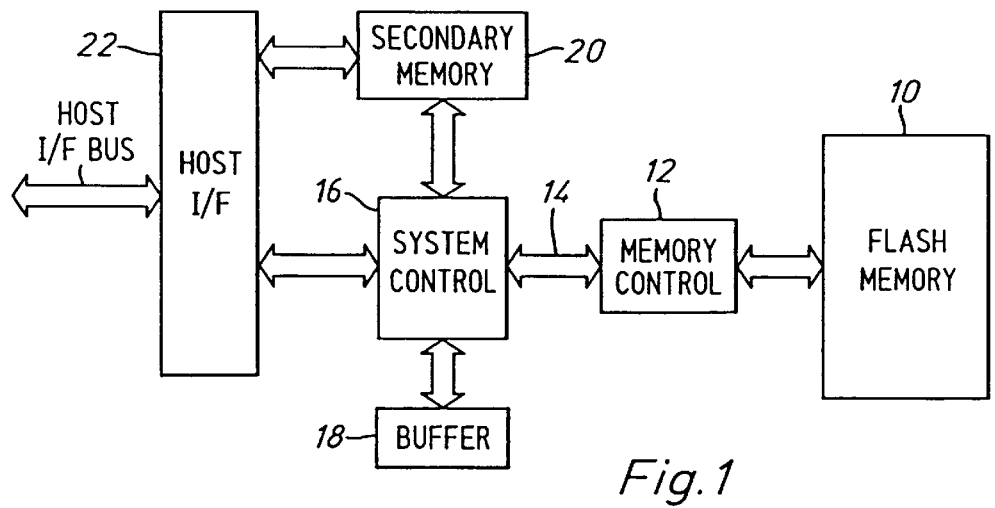
FIG. 1 shows a diagram of a memory system for emulating a magnetic disk drive.
Figure 2A:
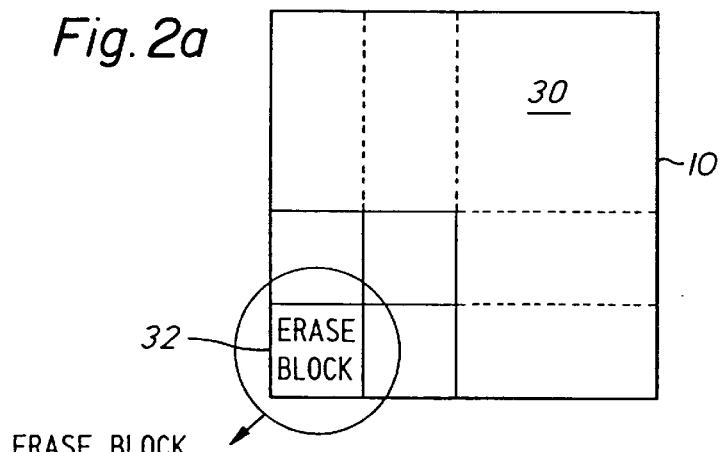
FIG. 2 shows the hierarchy of subdivisions within a FLASH memory.
Figure 2B:
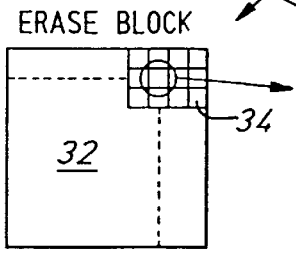
Figure 2C:
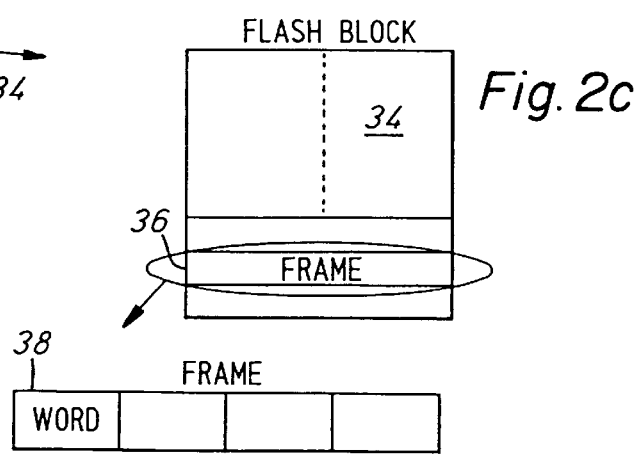
Figure 2D:
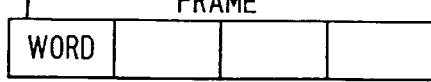

Referring to FIG. 1, a FLASH memory 10 is used as the main store for data received from the host. The FLASH memory 10 is controlled by a memory controller 12. The memory controller 12 operates between the FLASH memory 10 and a technology independent interface 14. The memory controller 12 controls the low-level execution of high level functions within the physical memory (FLASH memory 10). The memory controller 12 is memory technology dependent.

The technology independent interface 14 connects the memory controller 12 to a system controller 16. The system controller 16 manages the storage and accessing of block-structured data in the main FLASH memory 10 and in a write buffer 18 which is included to increase the speed of writing data to FLASH memory 10. The system controller 16 performs the following functions. It translates the logical address from the host to an address suitable for use with the FLASH memory 10, hereinafter referred to as the logical to physical address translation. This translation may result in one or more intermediate addresses being generated. It maintains any address lookup tables which are needed. It manages defective storage locations in the FLASH memory 10. It manages the write buffer 18. It manages the block erasure of FLASH memory 10. It manages the start-up and shut-down of the system after application and removal of power.

All sector writes from the host are directed to the write buffer 18. This minimises the effect of the slow write speed of FLASH memory. Sector data is transferred from the write buffer 18 to the FLASH memory 10 as a background task. In applications where the write speed is not important the write buffer 18 may be omitted.

The system controller 16 is connected to a secondary memory 20 and to a host interface 22. The secondary memory 20 is used to store information such as defective block and erasable block tables for FLASH memory 10, address translation tables, error logs, and microcontroller firmware. The secondary memory may be directly accessible from the host interface 22 to provide a directly mapped memory address space to the host. Referring to FIG. 2, a main FLASH memory 10 is arranged in the following hierarchy of subdivisions. A FLASH memory consists of one or more semiconductor chips 30. A semiconductor chip 30 is a physical subdivision which does not have any logical significance. An erase block 32 is a subdivision of a semiconductor chip 30. It is the minimum number of cells that may be deleted in an erase operation. The number of erase blocks in a semiconductor chip varies according to the size of the chip and the chip configuration. A rectangular group of word locations is assigned as a FLASH block. A FLASH block 34 is the minimum maskable block size for defect management. If a cell is faulty then the minimum area which may be masked and replaced is a FLASH block 34. Defect mapping has a granularity of one FLASH block 34. A sector is one data unit according to disk emulation protocols. The data stored in FLASH memory (typically 512 bytes plus ECC bytes and a header) will hereinafter be referred to as a FLASH sector: the data sent by the host operating system (typically 512 bytes) will hereinafter be referred to as a host sector. A host sector is the basic unit of data transfer with the host. The most common host sector size is 512 bytes. A frame 36 is an addressable sub-unit of a FLASH block 34, for example a row within a rectangular FLASH block 34. Each word 38 is randomly accessible as the minimum addressable unit at the technology independent interface 14. The word size is set by the width of the data I/0 to the memory system: it may be one, two, or four bytes.

The actual physical location of bits within a word is transparent to the algorithm used in the present invention. The FLASH memory is treated simply as a rectangular array of word locations.

The FLASH block 34 could be set to equal the host sector size (in most cases the host sector size is 512 bytes), the frame size or even the word size. The memory harvest (the fraction of gross memory that can be used for data storage) reaches a plateau below a certain value of FLASH block size, so that further reduction of the FLASH block size does not result in much improvement in the memory harvest. There are, however, disadvantages associated with having a small FLASH block size. The smaller the FLASH block size the more storage management space is required. The component test complexity also increases. Thus, there is an optimum range for the size of a FLASH block.

Different addressing formats could be used with this invention without departing from the inventive concept.

For 100% memory utilisation the start address for a sector must be the word immediately following the end address of the preceding sector. To accomplish this the start address is defined to a resolution of a single word. Since the FLASH sectors are stored without any intervening gaps, FLASH sectors will overflow both FLASH blocks and erase blocks. In such a case a FLASH sector is known as a split sector and its continuation region is located at the start of the following FLASH block or erase block. The start address of FLASH sectors within FLASH blocks will therefore be different for each FLASH block. To ensure that this is easily manageable, it is necessary to ensure that the order in which erase blocks are written corresponds exactly to their physical addressing order. If there is a defective cell in a FLASH block then the block will be masked out. This may give rise to the situation where part of a FLASH sector is stored in one FLASH block, the next FLASH block is masked out, and the rest of the FLASH sector is stored in the FLASH block immediately above the one that was masked out. FLASH memory space may therefore be discontinuous.

Figures 3A, 3B:
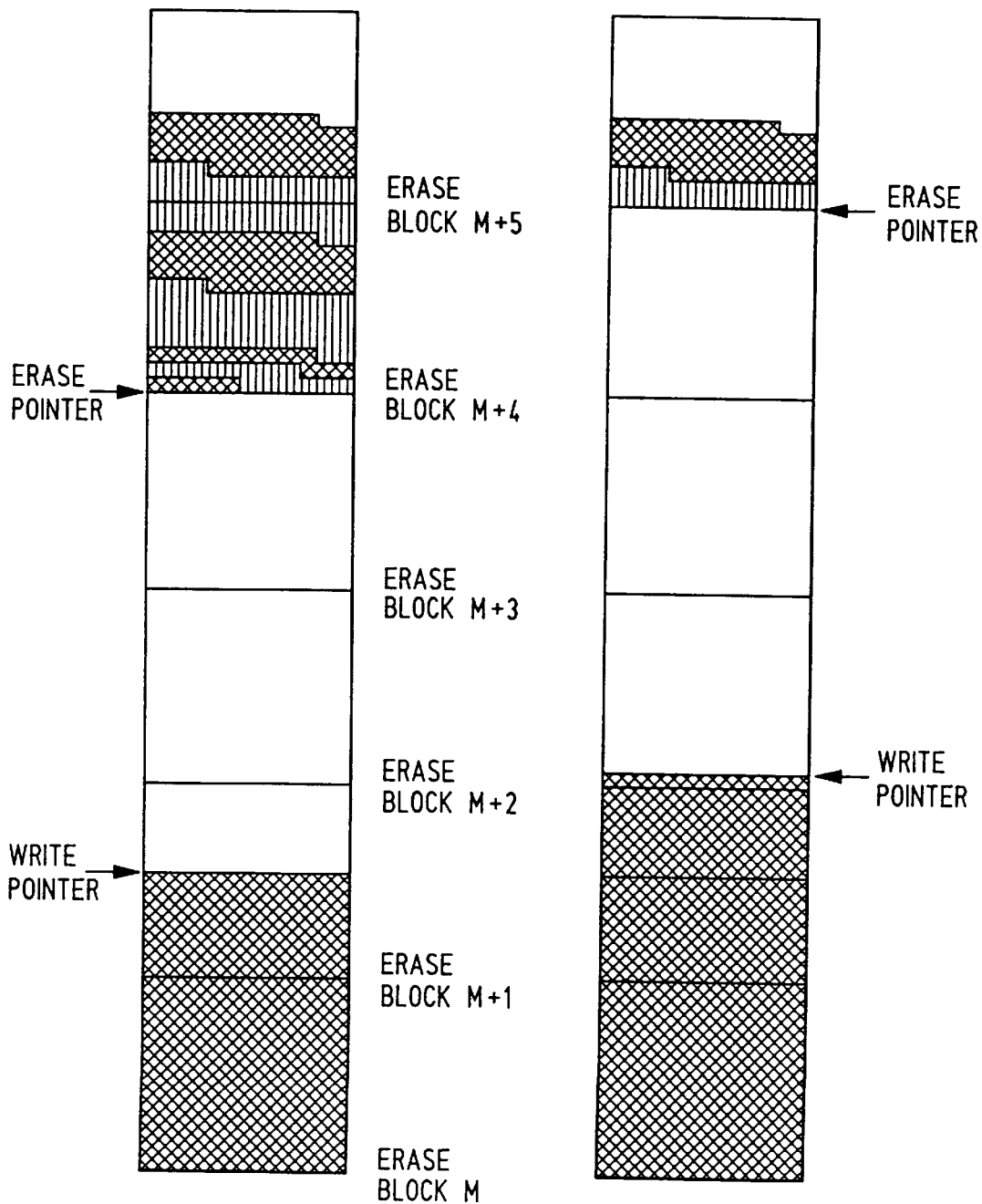
FIGS. 3A and 3B illustrate how the write/erase algorithm manages the location and frequency of erase and write operations in main FLASH memory.

FIGS. 3A and 3B illustrate how the write/erase algorithm manages the location and frequency of erase and write operations in main FLASH memory. FIG. 3A shows a FLASH memory prior to an erase/write phase, FIG. 3B shows the same FLASH memory after a write/erase phase.

The algorithm is based on the existence of two pointers, the write pointer and the erase pointer, defining current write and erase locations. The locations are defined as physical sector addresses and the pointers cycle through physical sector address space. The write pointer defines the physical sector number to which the next sector write operation should be directed. The physical location of this sector is guaranteed to have been previously erased in preparation for writing data by the system controller 16 in the memory system. Sector data to be written may have originated from either the write buffer 18 following a sector write from the host or from another sector in main FLASH memory 10 in preparation for an erase block erase operation. Following a sector write operation, the write pointer is incremented by one to point to the next highest physical sector address. When the write pointer reaches the highest usable physical sector address it then wraps around and points at the lowest usable physical address.

The erase pointer defines the erase block address in FLASH memory space of the next erase block which is scheduled for erasure. A second field in the erase pointer defines the physical sector number of the first complete sector located at the bottom of the erase block. Following an erase block erase operation, the erase block number is incremented by one. A lookup table (hereinafter referred to as the erase block table) provides the physical sector address of the first sector in the erase block that the erase pointer is pointing at. If the erase block is totally defective and contains no sectors which can be written to (signified by a specific entry in the erase block table) then the erase pointer is incremented again. When the erase pointer reaches the highest usable erase block it then goes back to the lowest part of the memory and points at the lowest usable erase block. Erase blocks are erased at a rate which aims to maintain an approximately constant number of erased sector locations immediately above the current write location. An erase operation is therefore performed when the difference between the sector numbers defined in the erase pointer and write pointer falls below a certain threshold value. Prior to erasure of an erase block, a sector containing valid data within that erase block must be relocated. Relocation of this valid data is accomplished by reading the sectors containing valid data into a relocate buffer (hereinafter referred to as a transfer buffer) and writing them back to the location pointed at by the write pointer. The logical to physical address translation table is updated to point to the new physical sector address for the sector. Since only valid sectors are relocated in this way and since sectors with obsolete data are automatically erased, automatic compaction of the stored data is provided.

The process established by this algorithm can be considered equivalent to a small contiguous region of erased memory cycling through the entire FLASH memory space, removing fragmented sectors it encounters at its upper boundary and compacting and relocating them at its lower boundary.

It will be appreciated that various modifications may be made to the above described embodiments within the scope of the present invention. For example, in an alternative arrangement, the contiguous region of erased memory cells moved in the other direction: that is, if the lower boundary removed fragmented sectors which were immediately below the lower boundary and valid data was written to the location immediately below the upper boundary.

I claim:

1. A memory system comprising:

a plurality of memory locations each having a pre-defined physical address, said memory locations being arranged in erasable blocks of memory locations;

translation means for translating a logical address to one of said predefined physical addresses, means for storing a first pointer that points to a memory location which is to be written to;

means for storing a second pointer that points to one of said erasable blocks which is to be erased, said erasable block which is to be erased being the next unerased erasable block in a predetermined sequence of erasable blocks, the predetermined sequence including said memory location to be written to; and control means being provided to progress the first pointer sequentially through the blocks of memory locations in order of said predetermined sequence, and to ensure that there is always at least one erased erasable block in said predetermined sequence of blocks between the erasable block containing said memory location indicated by the first pointer and the erasable block indicated by the second pointer.

2. A memory system according to claim 1 characterised in that said memory location to be written to is an unwritten memory location having the lowest physical address of all unwritten memory locations in the predetermined sequence.

3. A memory system according to claim 1 characterised in that said memory location to be written to is an unwritten memory location having the highest physical address of all unwritten memory locations in the predetermined sequence.

4. A memory system according to claim 1 characterised in that the next unerased erasable block corresponds to an unerased erasable block with the lowest physical address above the first pointer.

5. A memory system according to claim 1 characterised in that the next unerased erasable block corresponds to an unerased erasable block with the lowest physical address below the first pointer.

6. A memory system according to claim 1 further including a buffer to increase the speed of writing data to the memory locations.

7. A memory system according to claim 6 characterised in that said buffer is an SRAM buffer.

8. A memory system according to claim 6 characterised in that said buffer is a DRAM buffer.

9. A solid state memory according to claim 1 characterised in that said memory locations are provided in a FLASH EPROM.

10. A memory system according to claim 1 characterised in that each said memory location comprises a plurality of chalcogenide memory cells.

11. A memory system according to claim 1 characterised in that said memory locations are provided in a ferro-optic memory.

12. A memory system according to claim 1 characterised in that said control means is selected from: a microprocessor, a microcontroller, and a state machine.

* * * * *